July 21, 1942. J. G. BLASER 2,290,268
AUTOMATIC FISHING REEL
Filed Nov. 30, 1939 3 Sheets-Sheet 1

Inventor
Joseph G. Blaser,

By Clarence A. O'Brien
and Hyman Berman
Attorneys

July 21, 1942.  J. G. BLASER  2,290,268

AUTOMATIC FISHING REEL

Filed Nov. 30, 1939  3 Sheets-Sheet 2

Inventor
Joseph G. Blaser

By Clarence A. O'Brien
and Hyman Berman
Attorneys

July 21, 1942.  J. G. BLASER  2,290,268
AUTOMATIC FISHING REEL
Filed Nov. 30, 1939  3 Sheets-Sheet 3

Inventor
Joseph G. Blaser,
By Clarence A. O'Brien
and Hyman Berman
Attorneys

Patented July 21, 1942

2,290,268

UNITED STATES PATENT OFFICE 2,290,268

AUTOMATIC FISHING REEL

Joseph G. Blaser, American Falls, Idaho, assignor of ten per cent to Jacob Schoessler, American Falls, Idaho Application November 30, 1939, Serial No. 306,930

2 Claims. (Cl. 242—84.3)

This invention appertains to new and useful improvements in fishing reels and more particularly to an attachment for automatic reels whereby the reel can be simply converted into a free-spooling or casting reel with the principal object being to hold the spring tension of the automatic winding reel feature available for the reel at any or all positions of use.

Another important object of the invention is to provide an attachment of the character stated which will permit the use of the reel either as a conventional, automatic or as a free-spool, at will, without releasing the usual reel spring tension.

Other objects and advantages of the invention will become apparent to the reader of the following specification.

In the drawings—

Figure 1:
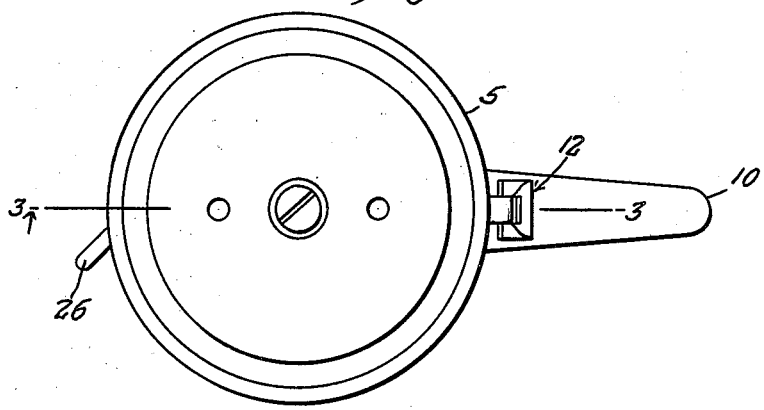
Figure 1 represents a side elevational view of the reel.
Figure 4:
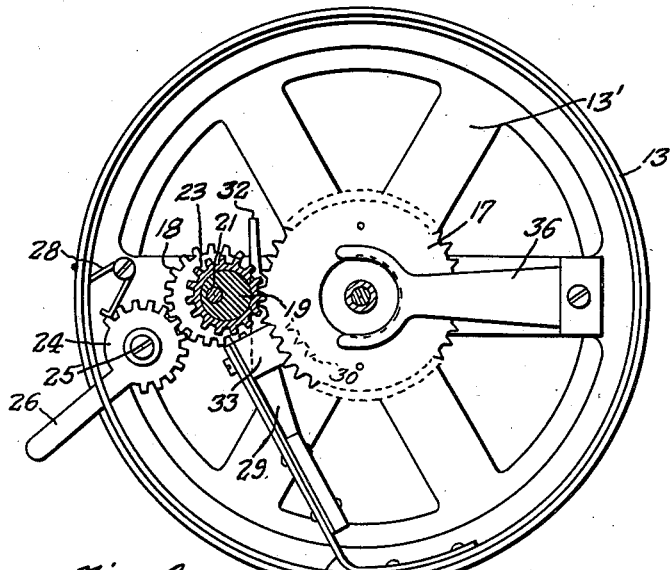
Figure 4 is a transverse sectional view on the line 4—4 of Figure 3.
Figure 2:
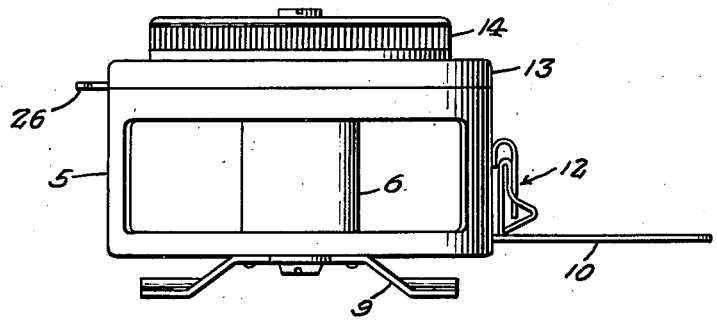
Figure 2 is a top plan view.
Figure 5:
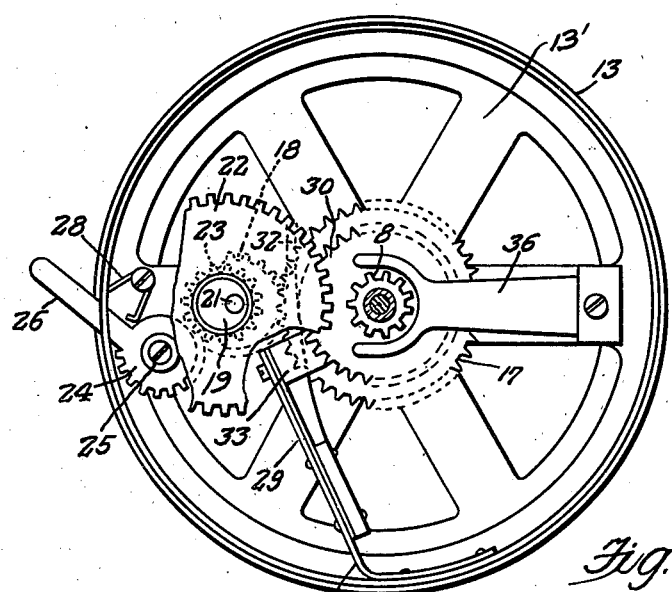
Figure 5 is a sectional view taken substantially on the line 5—5 of Figure 3.

Referring to the drawings wherein like numerals designate like parts, it can be seen that numeral 5 represents the usual reel frame in which the spool 6 is mounted, this spool 6 being carried by the sleeve 7 on which is the driven gear 8.

At one end of the frame 5 is the usual rod attaching arm 9.

Numeral 10 denotes the usual brake arm having the brake shoe 11 engageable with one side of the reel spool 6 and this arm extends exteriorly of the frame 5 and is provided with conventional holding means 12.

Numeral 13 represents the gear housing which has a portion which is slippable into the frame 5 while numeral 14 represents the spring housing which is attachable to the gear housing 13.

In the spring housing 14 is the spring 15 which is connected to the ratchet sleeve 16 forming its core. The ratchet toothed end of this sleeve 16 engages with the ratchet teeth on the conventional gear 17. This gear 17 has attached thereto a gear 30 which is of smaller diameter than the gear 17 and a spring 36 acts to hold the ratchet teeth of gear 17 in engagement with the ratchet toothed end of the sleeve 16.

Figure 6:
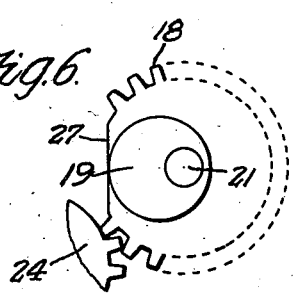
Figure 6 is a fragmentary elevational view of the cam means.
Figure 3:
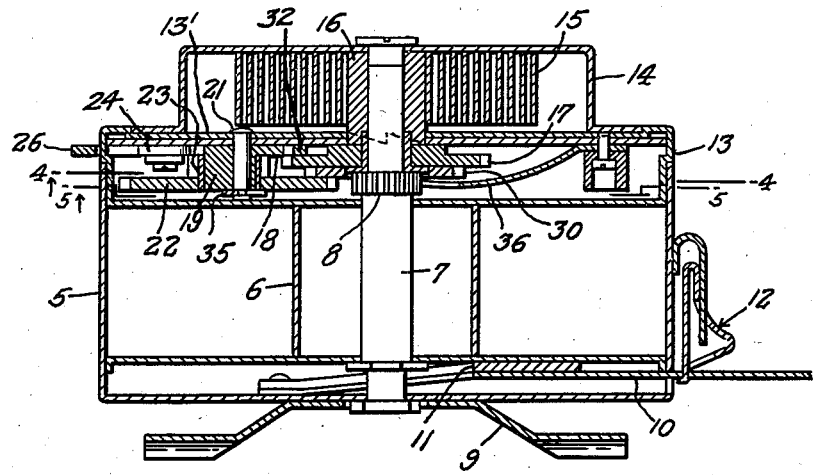
Figure 3 is a diametrical sectional view through the reel.
Figure 7:
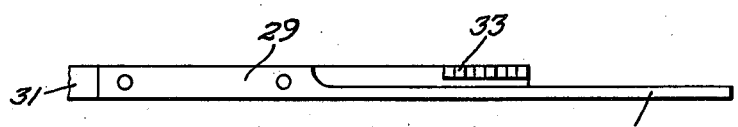
Figure 7 is an edge elevational view of the latch.
Figure 8:
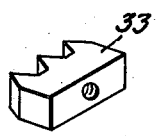
Figure 8 is a perspective view of the latch block.
Figure 9:
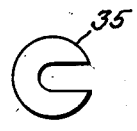
Figure 9 is a plan view of a slotted washer.
Figure 10:
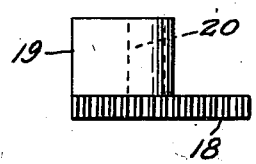
Figure 10 is a side elevational view of the cam and gear unit.

In carrying out my invention I provide an eccentrically mounted shaft 19 which has an eccentrically arranged bore 20 passing therethrough for receiving the pin 21 carried by the plates 13' which separate the gear housing from the spring housing. A mutilated gear 18 is eccentrically connected at one end to the shaft 19 and said gear has a flat part 27 at one side thereof as shown in Figure 6. An idle gear 22 has a pinion 23 connected with its hub and said hub rotatably fits over the shaft 19, the gear and pinion being held on the shaft by a notched spring washer 35, see Figure 9, which engages a groove in the adjacent end of the pin 21. A gear 24 is rotatably supported on a pin 25 carried by the plates 13' with its teeth meshing with the teeth of the gear 18 and said gear 24 has a handle 26 connected therewith which passes through a slot in the periphery of the gear housing 13 so that the gear 24 can be partly rotated by moving this handle 26 and this partial rotation of the gear 24 will partly rotate the gear 18 and thus turn the shaft 19 on an eccentric axis formed by the pin 21. When the shaft 19 is turned in one direction it will cause the gear 22 to mesh with the gear 8 and the pinion 23 will mesh with the gear 17 and thus the spool will be rotated by the spring 15 through the gear 17, pinion 23, gear 22 and gear 8. When the lever 26 is moved in an opposite direction the gear 18 will move the shaft 19 in a direction to move the pinion 23 and the gear 22 out of mesh with the gear 17 and gear 8, respectively, so as to provide free movement of the spool and in order to lock the gear 17 against movement by the spring 15, I provide an arm 29 connected to an internal part of the gear housing by a leaf spring 31 with the arm carrying a toothed block 33 for engaging some of the teeth of the gear 30 attached to the gear 17, the spring tending to hold the arm in position with the detent or block 33 out of engagement with the gear 30. The arm is provided with the obliquely disposed leg 32 which is held against the gear 18 by the spring 31, this gear 18 holding the arm with its leg 32 in position with the block engaging the gear 30 when the toothed part of the gear 18 is engaging the leg and as soon as the straight part 27 of the gear 18 comes opposite the leg 32 the spring 31 will move the arm to a position where the leg 32 will engage the straight part 27 and the block 33 will be out of engagement with the gear 30.

Thus when the spool is to be driven by the spring 15 the lever or handle 26 is moved to a position to cause the shaft to move the pinion 23 into engagement with the gear 17 and the gear 22 in engagement with the gear 8 and when these gears are engaged the flat part 27 of gear 18 will be opposite the leg 32 so that the detent or block 33 will thus be out of engagement with the gear 30 and thus the spool is rotated by the spring 15 when the brake lever 10 is released. When it is desired to secure free spooling, such as when a cast is to be made the lever or handle 26 is moved in the opposite direction which will cause the shaft 19 to move the pinion 23 and gear 22 out of mesh with the gear 17 and gear 8 respectively and this movement causes the gear 18 to move the leg 32 and the arm 29 to position so that the block 33 will engage the gear 30 and thus lock the gear 17 against movement by the spring 15.

A spring 28 is provided in the gear housing for holding the gear 24 and its handle 26 in adjusted position.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. In a spring winding reel, the combination with a rotatable spool, a spring operated driving gear, a one-way driving connection between said spring and gear, and a spool rotating driven gear, of means to operatively connect said driving gear to said driven gear comprising a pair of motion transmitting gears eccentrically mounted for rotary adjustment in unison about a common axis into and out of meshing engagement relative to said driving and driven gears, respectively, means to manually adjust said pair of gears comprising a gear sector rotatable in opposite directions about said common axis, and means to lock said driving gear against rotary movement as an incident to adjustment of said pair of gears out of meshing engagement.

2. In a spring winding reel, the combination with a rotatable spool, a spring operated driving gear, a one-way driving connection between said spring and gear, and a spool rotating driven gear, of means to operatively connect said driving gear to said driven gear comprising a pair of motion transmitting gears eccentrically mounted for rotary adjustment in unison about a common axis into and out of meshing engagement relative to said driving and driven gears, respectively, means to manually adjust said pair of gears comprising a gear sector rotatable in opposite directions about said common axis, and means to lock said driving gear against rotary movement as an incident to adjustment of said pair of gears out of meshing engagement, said locking means comprising a flat part on said sector, a toothed wheel fast on said driving gear, and a resilient detent arm normally disengaged from said wheel by having a part of the arm engaging said flat part and said arm being movable by said sector into engagement with the toothed wheel when the sector is moved to engage its toothed part with said part of the detent arm.

JOSEPH G. BLASER.